United States Patent [19]

Sugimori

[11] 4,190,341
[45] Feb. 26, 1980

[54] MOTOR DRIVE DEVICE FOR CAMERA
[75] Inventor: Shiro Sugimori, Kawasaki, Japan
[73] Assignee: Nippon Kogaku K.K., Tokyo, Japan
[21] Appl. No.: 851,745
[22] Filed: Nov. 15, 1977
[30] Foreign Application Priority Data
  Nov. 22, 1976 [JP] Japan .................. 51-139489
[51] Int. Cl.² .................................. G03B 1/18
[52] U.S. Cl. .......................... 354/173; 354/212
[58] Field of Search .......... 354/170, 171, 172, 173, 354/212; 352/169

[56] References Cited
U.S. PATENT DOCUMENTS
3,946,409  3/1976  Toyoda .................. 354/173

*Primary Examiner*—Michael L. Gellner
*Attorney, Agent, or Firm*—Fitzpatrick, Cella, Harper & Scinto

[57] ABSTRACT

A motor drive device for a camera comprises a film advance shaft for advancing film with the aid of the drive from a motor. A rotary shaft has a connecting portion and is effective to transmit the rotation to the film advance shaft, and a drive plate is rotatably mounted on the rotary shaft and is rotatable by the drive motor. A movable plate is rotatably mounted on the rotary shaft, a bias member biases both the movable plate and the drive plate so as to rotate them together and a coupling member formed with a coupling portion is capable of being coupled to the connecting portion, the coupling member being pivotally mounted on the movable plate for displacement between a coupled position and a non-coupled position. Change-over means are arranged for changing over the coupling member from the non-coupled position to the coupled position when the change-over means lies in the orbit of the coupling member, and a release is provided on the drive plate so as to pivotally move the coupling member to the non-coupled position against the bias of the bias member when the coupling member is in the coupled position by the displacement of the relative position between the drive plate and the movable plate which results from an increased film advance load after completion of film advance.

5 Claims, 7 Drawing Figures

MOTOR DRIVE DEVICE FOR CAMERA

BACKGROUND OF THE INVENTION

1. Field of the Invention

This invention relates to a novel motor drive device for a camera.

2. Description of the Prior Art

The motor drive devices heretofore used are known to perform the following functions. A rotatable cam biased by a spring in the thrust direction is rotated by a motor. When a roller lies on one of the ramps of the projected portion of the rotatable cam which is projected in the thrust direction, the roller is moved by that ramp to effect film advance. When the roller tries to stop due to an increased film advance load upon completion of film advance, the roller rides onto the projected portion to stop the motor. When the shutter button is again depressed simultaneously therewith to supply power to the motor, the rotatable cam begins to rotate and the roller rolls down the other ramp of the projected portion to effect shutter release. In these devices, however, the roller for effecting film advance and detecting the completion of film advance is always brought into contact with the cam by the spring force and this may cause some residual torque to remain in the spring at the completion of film advance. Therefore, when shutter release is effected by the shutter button, vibration thereof may undesirably cause the residual torque in the spring to be transmitted to the film to vibrate the image plane during photography.

SUMMARY OF THE INVENTION

It is an object of the present invention to provide a motor drive device for a camera which overcomes the above-noted disadvantages.

According to the present invention, the motor drive device for a camera comprises a film advance shaft for advancing film with the aid of the drive from a motor, a rotary shaft having a connecting portion and effective to transmit its own rotation to the film advance shaft, a drive plate rotatably mounted on the rotary shaft and rotatable by the drive from the motor, a movable plate rotatably mounted on the rotary shaft, a bias member for biasing both of the movable plate and the drive plate so as to rotate them together, a coupling member having a coupling portion capable of being coupled to the connecting portion, the coupling member being pivotally mounted on the movable plate for displacement between a coupled position in which the coupling portion is coupled to the connecting portion to transmit the drive from the motor to the rotary shaft and a non-coupled position in which the coupling is retracted from the coupled position, change-over means for changing over the coupling member from the non-coupled position to the coupled position when the change-over means lies in the orbit of the coupling member, and a release member provided on the drive plate so as to pivotally move the coupling member to the non-coupled position against the bias of the bias member when the coupling member is in the coupled position by the displacement of the relative position between the drive plate and the movable plate resulting from an increased film advance load after completion of film advance.

The invention will become more fully apparent from the following detailed description thereof taken in conjunction with the accompanying drawings.

DESCRIPTION OF THE PREFERRED EMBODIMENTS

Description will first be made of the clutch employed in the present invention.

Figure 1:
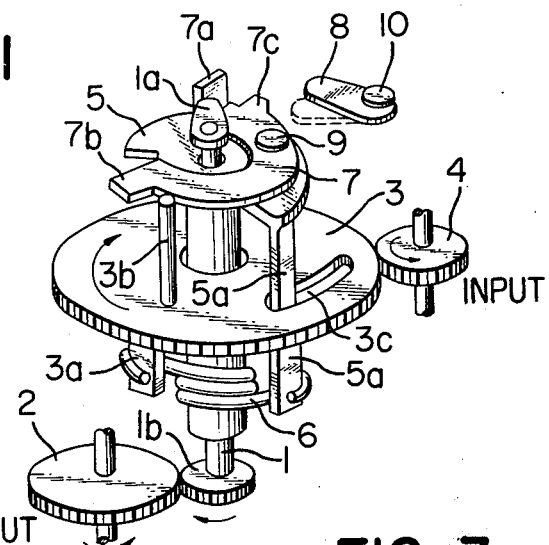
FIGS. 1 and 2 are a perspective view of a clutch employed in the present invention and a plan view of essential portions of the clutch, respectively.
Figure 2:
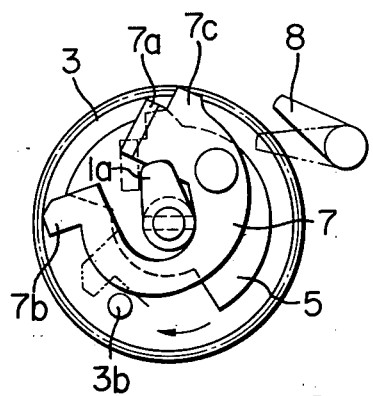

Referring to FIGS. 1 and 2 which are a perspective view of the clutch according to the present invention and a plan view of the essential portions thereof, respectively, a shaft 1 is rotatably journalled and has a connecting portion 1a at one end and a gear 1b at the other end. The gear 1b is engaged with a transmission gear 2 so that the rotation of the gear 1b is transmitted through the transmission gear 2. A drive gear plate 3 is rotatably mounted on the rotary shaft 1 coaxially therewith and engaged with a drive gear 4 so as to be driven by the latter. The drive gear plate 3 has integrally formed therewith a member 3a and a release pin 3b, and also has formed therein a slot 3c extending circumferentially thereof. A movable plate 5 is rotatably mounted on the rotary shaft 1 coaxially therewith and has an integrally formed leg 5a. The leg 5a extends downwardly through the slot 3c.

A torsion spring 6 is provided between the member 3a and the leg 5a to impart a torsional torque to them so that the torsional torque moves the leg 5a in the same direction with movement of the member 3a. A coupling member 7 is pivotally mounted on the movable plate 5 by means of a pin 9. The coupling member 7 has a first engagement portion 7a engageable with the connecting portion 1a of the rotary shaft 1, a second engagement portion 7b engageable with the release pin 3b, and a third engagement portion 7c engageable with a change-over lever 8 which will hereinafter be described. The change-over lever 8 is rotatably supported by a pin 10 and as best seen in FIG. 2, becomes engageable with the third engagement portion 7c when it is in the orbit of the third engagement portion 7c.

Operation of this clutch will now be described.

As the drive gear 4 is rotated counter-clockwisely (direction of arrow) from the position of FIGS. 1 and 2, the drive gear plate 3 is rotated clockwisely (direction of arrow). With this rotation, the movable plate 5 is also rotated in the same direction with the drive gear plate through the intermediacy of the torsion spring 6 and the leg 5a. When this occurs, the change-over lever 8 is in its solid-line position as best shown in FIG. 2. When the first engagement portion 7a is not in engagement with the connecting portion 1a, the rotary shaft 1 and accordingly the transmission gear 2 is not rotated. Thus, as long as the drive gear 4 is rotated, the drive gear plate 3, the movable plate 5 and the coupling member 7 are rotated about the rotary shaft.

Next, the change-over lever 8 is moved into the orbit of the third engagement portion 7c as indicated by broken lines in FIGS. 1 and 2. In this case, the tip end of the change-over lever 8 engages the third engagement portion 7c, so that the coupling member 7 is pivotally moved counter-clockwisely on the movable plate 5 and the first engagement portion 7a is engaged with the connecting portion 1a at the position indicated by dot-and-dash line in FIG. 2. Thereafter, even if the change-over lever 8 is returned to its solid-line position, the rotary shaft 1 is movable with the drive gear plate 3, the movable plate 5 and the coupling member 7 through the agency of the connecting portion 1a.

In a little while, the load on the output side of the transmission gear 2 is increased, that is, an output greater than a predetermined torque is called for, whereupon the elements 1, 7 and 5 are stopped while the drive gear plate 3 is still moved clockwisely against the force of the torsion spring 6. With this movement, the release pin 3b approaches the second engagement portion 7b for engagement therewith as indicated by dots-and-dash lines in FIG. 2. By this engagement, the coupling member 7 is rotated clockwisely to release the engagement between the first engagement portion 7a and the connecting portion 1a. Upon the disengagement between the connecting portion 1a and the first engagement portion 7a, the clutch restores its position indicated by solid lines in FIGS. 1 and 2. At this time, the change-over lever 8 lies outside the orbit of the third engagement portion 7c, so that the rotary shaft 1 is not rotatable irrespective of rotation of the drive gear plate 3.

Figure 3:
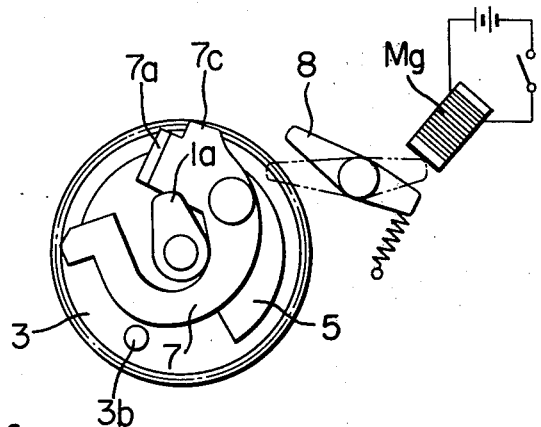
FIG. 3 is a plan view of another form of the clutch and showing essential portions thereof.

FIG. 3 shows an arrangement in which the change-over lever 8 is controllable by being attracted by electrical energization of an electromagnet Mg. This arrangement readily enables the change-over lever to be controlled, and may easily be associated with other mechanism. Thus, the change-over lever 8 is also controllable by an electromagnet.

Figure 4:
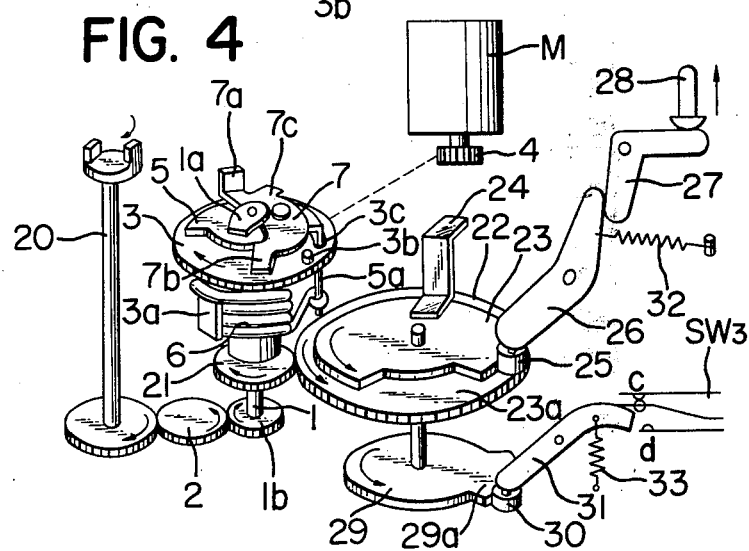
FIGS. 4 and 5 are schematic perspective views of the motor drive device according to the present invention and showing the device when film advance has been completed and immediately before the film advance is effected, respectively.
Figure 5:
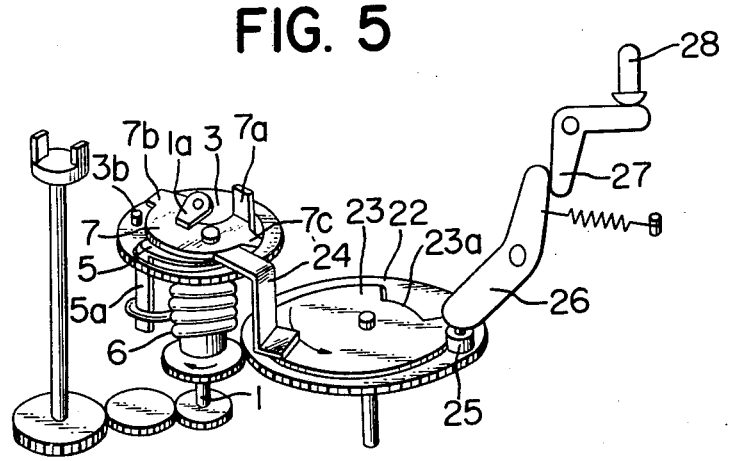

FIGS. 4 and 5 are schematic perspective views of the camera motor drive device according to the present invention and showing the device when film advance has been completed and immediately before the film advance is effected, respectively. Members functionally similar to those already shown are given similar reference characters and need not be described.

Designated by M is a motor for rotatively driving the drive gear 4. A film advance shaft 20 is rotated by the transmission gear 2 and coupled to an unshown film windup shaft of the camera body. A gear 21 is rotatable with the drive gear plate 3. A large gear 22 is in mesh engagement with the gear 21 and rotated at one-third of the rotational velocity of the drive gear plate 3. The large gear 22 is integral with a face cam 23 having a cut-away portion 23a. A change-over lever 24 is provided on top of the face cam 23. This change-over lever 24 can move the coupling member 7 counter-clockwisely when it is in the orbit of the third engagement portion 7c of the coupling member 7. A roller 25 is provided at one end of a lever 26 and is in contact with the face cam 23. The lever 26 is biased for clockwise rotation by a spring 32. A release lever 27 raises a release rod 28 upon clockwise rotation of the lever 26, thereby effecting shutter release. Another face cam 29 has a projected portion 29a and is rotatable with the large gear 22. A roller 30 is provided at one end of a lever 31 and is always in contact with the face cam 29. The lever 31 is biased for clockwise rotation by a spring 33. The other end of the lever 31 controls a phase switch SW3 which will hereinafter be described.

Figure 6:
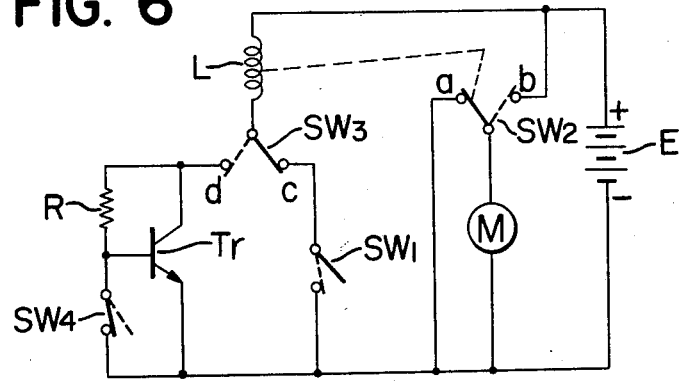
FIG. 6 is a diagram of a well-known sequence control circuit for controlling the motor.
Figure 7:
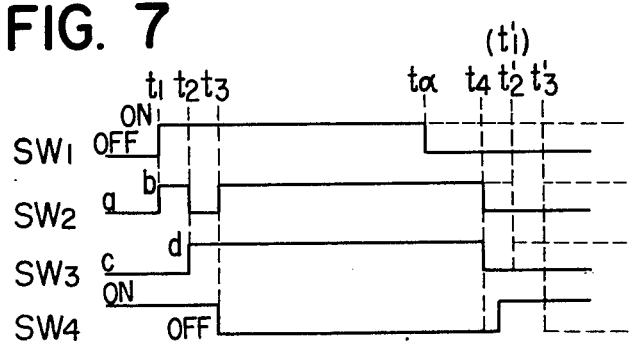
FIG. 7 is a time chart therefor.

FIG. 6 is a diagram of a well-known sequence control circuit for controlling the motor of the above-described motor drive device, and FIG. 7 is a time chart therefor. FIG. 6 shows the position in which film advance has been completed. In FIG. 7, solid lines refer to the single-frame photography mode and broken lines refer to the continuous photography mode.

Designated by SW1 is a switch operatively associated with an unshown operating button. The phase switch SW3 is controllable by the face cam 29. Switch SW4 receives a signal from the camera side and may be opened by movement of a trailing curtain of shutter, not shown, and closed after completion of film advance. Switch SW2 is changeable over from its contact a to its contact b upon energization of a relay coil L. Resistor R is set such that when there is formed a circuit of $\oplus$ - L - contact d - R - SW4 - $\ominus$, the magnitude of the current flowing to the relay coil L becomes lower than the level necessary to energize the relay and closes the switch SW2 at its contact a. Transistor Tr is conductive when the switch SW3 is closed at its contact d with the switch SW4 opened.

By reference to FIGS. 4 to 7, single-frame photography operation of this motor drive device will now be described.

When an unshown operating button is depressed from the position of completed film advance shown in FIGS. 4, 6 and 7, the switch SW1 is closed. This corresponds to the point of time t in FIG. 7. Since the switch SW3 is then closed at its contact c by the face cam 29, the coil L is electrically energized and the switch SW2 shifts to its contact b to drive the motor M. By the drive from the motor M, the drive gear plate 3 and the gear 21 are rotated clockwisely and the large gear 22 and the face cam 29 are rotated counter-clockwisely. Accordingly, the roller 25 comes into the cut-away portion 23a and the release rod 28 is moved in the direction of arrow, indicated at the right-hand side of FIG. 4, to drive an unshown shutter mechanism to move the preceding curtain of shutter. This corresponds to the point of time $t_2$ in FIG. 7. At the same time, the roller 30 slides down the projected portion 29a so that the switch SW3 shifts from its contact c to its contact d. Since the switch SW4 is closed at the end of film advance, as already noted, the transistor Tr is non-conductive and the current flows along $\oplus$ - L - contact d - R - SW4 - $\ominus$, but since, as already noted, the value of this current is lower than the level for energizing the relay, the switch SW2 shifts from its contact b to its contact a to stop the motor M. Accordingly, the drive gear plate 3 is stopped at the same time therewith. After a predetermined shutter time, the trailing curtain of shutter begins to move. This corresponds to the point of time $t_3$ in FIG. 7, whereat the switch SW4 is opened to form a circuit of $\oplus$- L -contact d - Tr - $\ominus$, so that the switch SW2 shifts from its contact a to its contact b, thus driving the motor M again.

By the drive from the motor M, the drive gear plate 3 and the gear 21 are again rotated clockwisely while the large gear 22 and the face cam 29 are again rotated counter-clockwisely and, as shown in FIG. 5, the change-over lever 24 comes into the orbit of the third engagement portion 7c of the coupling member 7, whereupon the change-over lever 24 actuates the rotating third engagement portion 7c so that the connecting portion 1a of the rotary shaft 1 comes into engagement with the first engaging portion 7a of the coupling member 7. After that, the drive gear plate 3 and the rotary shaft 1 are rotated together. Of course, if the shutter time is set to a value less than the time from when the roller 25 has come into the cut-away portion 23a until the change-over lever 24 comes into the orbit of the third engagement portion 7c, then it will not be necessary to stop the motor by releasing the engagement between the member 1a and the change-over lever 24 and bringing about non-transmitting relation between the rotation of the motor and the film advance shaft. With the rotation of the rotary shaft 1, the film advance shaft 20 rotates unshown film windup shaft of the camera to effect film advance. During the film advance, shutter charge is also being effected by an unshown mechanism. During the film advance, the roller 25 comes out of the cut-away portion 23a of the face cam 23 with the rotation of the cam 23 and the release lever 27 is rotated clockwisely to lower the release rod 28, thus becoming ready for another shutter release operation. Before the number of rotations of the drive gear plate 3 as counted from the time $t_1$ whereat unshown operating button was depressed reaches three full rotations, or before the large gear 22 makes one full rotation, film advance by one frame is completed and the film advance shaft 20 is stopped by unshown mechanism. Thus, the rotational torque is increased. Accordingly, the rotary shaft 1 is stopped while the drive gear plate 3 is rotated clockwisely against force of the torsion spring 6, so that the relative position between the drive gear plate 3 and the movable plate 5 is changed. In this manner, the release pin 3b on the drive gear plate 3 actuates the second engagement portion 7b on the coupling member 7 pivotally mounted on the movable plate 5. As the result, the coupling member 7 is rotated clockwisely and the engagement between the connecting portion 1a and the first engagement portion 7a is released. Thereafter, the drive gear plate 3 and the movable plate 5 restore their relative position of FIG. 4 due to the bias of the spring 6. During the time from the completion of film advance or the disengagement between the connecting portion 1a and the first engagement portion 7a until the number of rotations of the drive gear plate 3 reaches three full rotations or the number of rotations of the large gear 22 reaches one full rotation, the roller 30 rides onto the projected portion 29a with the rotation of the face cam 29 to change over the switch SW3 from its contact d to its contact c. If the operating button was then released from its depressed position, the switch SW1 will have been opened so that the motor M will be stopped with the switch SW2 shifted to its contact a. In FIG. 7, release of the operation button takes place at the point of time $t_\alpha$ and stop of the motor takes place at the point of time $t_4$. After this point of time $t_4$ has been passed, the switch SW4 is closed. This position is shown in FIGS. 4 and 6.

In FIG. 7, the condition of the motor rotation can be readily seen from the ON-OFF condition of the switch SW2.

If, at $t_4$, the operating button remains depressed, operations $t_1'$, $t_2'$ and $t_3'$ corresponding to $t_1$, $t_2$ and $t_3$ will be repeated as shown by broken lines in FIG. 7, thereby accomplishing continuous photography.

In the embodiment described above, the power supply to the motor is cut off upon detection of the completion of film advance. However, the motor need not always be stopped during the continuous photography mode because the operative association between the motor and the film advance shaft is automatically broken upon completion of film advance. This means the possibility of continued motor operation. Of course, no fear would arise that the film should move during shutter release.

According to the present invention, as hitherto described in detail, the transmission of the force to the film advance shaft can be completely cut off from completion of film advance till after shutter release, thus preventing any inadvertent force from being transmitted to the film during photography. This eliminates the fear that vibration of image should take place when the camera's shutter button is depressed after the film has been advanced by the motor drive. The clutch of the present invention is also advantageous in that it is simpler and more compact in construction than the clutches of the prior art.

I claim:

1. A motor drive device for a camera comprising:
   a film advance shaft for advancing film with the aid of a drive from a motor,
   a rotary shaft having a connecting portion and effective to transmit its rotation to said film advance shaft;
   a drive plate rotatably mounted on said rotary shaft and rotatable by the drive from said motor;
   a movable plate rotatably mounted on said rotary shaft;
   resilient drive connection means between said drive plate and said movable plate so as to rotate them together, the resilient drive connection means allowing a relative rotation of the drive plate when the movable plate is stopped;
   a coupling member pivotally mounted on said movable plate and being movable between a coupled position in which said coupling member is coupled to said rotary shaft so that the rotary shaft rotates in unison with said drive plate through said coupling member and a non-coupled position in which said coupling member and said rotary shaft are free from each other;
   change-over means for changing over said coupling member from said non-coupled position to said coupled position by actuating said coupling member; and
   a release member provided on said drive plate so as to pivotally move said coupling member to said non-coupled position when said movable plate in said coupled position is stopped through the coupling member by an increased film advance load applied to the rotary shaft after completion of film advance.

2. A motor drive device according to claim 1, wherein said change-over means has a rotatable plate driven from said motor and a change-over lever rotatable with said rotatable plate and adapted to come into engagement with said coupling member at a predetermined time after shutter release to pivotally move the same into coupling relationship to said connecting portion.

3. A motor drive device according to claim 2, wherein said drive plate is integrally formed with a member mounted on said rotary shaft and engageable with said rotatable plate to transmit the drive from said motor to said rotatable plate.

4. A motor drive device according to claim 3, further comprising;

means for controlling the shutter and the motor, the controlling means being rotated in unison with the rotatable plate to generate a shutter release signal and a motor control signal.

5. A motor drive device according to claim 4, wherein said control means has a first face cam for generating said shutter release signal and a second face cam for detecting the completion of film advance, said first and second face cams being formed integrally with each other.

* * * * *